United States Patent
Barnhart et al.

(10) Patent No.: US 10,814,395 B2
(45) Date of Patent: Oct. 27, 2020

(54) HEATED GAS CIRCULATION SYSTEM FOR AN ADDITIVE MANUFACTURING MACHINE

(71) Applicant: General Electric Company, Schenectady, NY (US)

(72) Inventors: David Richard Barnhart, Jefferson, OH (US); Douglas Gerard Konitzer, West Chester, OH (US); Rajendra Madhukar Kelkar, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/878,584

(22) Filed: Jan. 24, 2018

(65) Prior Publication Data

US 2019/0224749 A1    Jul. 25, 2019

(51) Int. Cl.
    *B22F 3/105*    (2006.01)
    *B33Y 30/00*    (2015.01)
    (Continued)

(52) U.S. Cl.
    CPC ............ *B22F 3/1055* (2013.01); *B33Y 30/00* (2014.12); *B22F 2003/1056* (2013.01);
    (Continued)

(58) Field of Classification Search
    CPC .... B33Y 30/00; B22F 3/1055; B22F 2201/00; B22F 2003/1056; B22F 2203/11;
    (Continued)

(56) References Cited

U.S. PATENT DOCUMENTS

| 4,818,562 A | * | 4/1989 | Arcella ................. B22D 23/06 |
| | | | 118/429 |
| 5,287,435 A | | 2/1994 | Cohen et al. |

(Continued)

FOREIGN PATENT DOCUMENTS

| CN | 103341625 A | 10/2013 |
| CN | 105880591 A | 8/2016 |
| CN | 206286554 U | 6/2017 |

OTHER PUBLICATIONS

Rich Edmonds, "How to keep dust out of your PC and enjoy a cool experience", Sep. 13, 2016, https://www.windowscentral.com/how-keep-dust-out-your-pc-and-keep-everything-cool (Year: 2016).*

(Continued)

*Primary Examiner* — Peter L Vajda
*Assistant Examiner* — Caroline Montiel
(74) *Attorney, Agent, or Firm* — Dority & Manning, P.A.

(57) ABSTRACT

An additive manufacturing machine includes a heated gas circulation system for regulating the temperature of additive powder throughout a powder bed and parts formed therein. The additive manufacturing machine includes a build platform defining a plurality of perforations and a heated gas supply that provides a flow of heated air into a distribution manifold and through the plurality of perforations and the powder bed to minimize temperature gradients within the powder bed which might otherwise result in distortion, thermal stresses, or cracking in the finished part.

19 Claims, 3 Drawing Sheets

(51) Int. Cl.
*B23K 26/12* (2014.01)
*B23K 26/342* (2014.01)

(52) U.S. Cl.
CPC ... *B22F 2003/1058* (2013.01); *B22F 2201/00* (2013.01); *B22F 2201/10* (2013.01); *B22F 2203/11* (2013.01); *B22F 2999/00* (2013.01); *B23K 26/12* (2013.01); *B23K 26/342* (2015.10)

(58) Field of Classification Search
CPC ............. B22F 2999/00; B22F 2201/10; B22F 2003/1058; B29C 64/25; B29C 64/245; B29C 64/295; B29C 64/30; B29C 64/153; B29C 64/165; B23K 26/342; B23K 26/12
See application file for complete search history.

(56) References Cited

U.S. PATENT DOCUMENTS

| | | | |
|---|---|---|---|
| 5,647,931 A * | 7/1997 | Retallick | B22F 3/004 156/273.3 |
| 5,805,971 A | 9/1998 | Akedo | |
| 6,084,196 A | 7/2000 | Flowers et al. | |
| 6,492,651 B2 | 12/2002 | Kerekes | |
| 6,621,039 B2 | 9/2003 | Wang et al. | |
| 6,989,115 B2 | 1/2006 | Russell et al. | |
| 8,172,562 B2 | 5/2012 | Mattes | |
| 8,373,092 B2 | 2/2013 | Dietrich | |
| 8,666,142 B2 | 3/2014 | Shkolnik et al. | |
| 8,753,105 B2 | 6/2014 | Scott | |
| 9,027,378 B2 | 5/2015 | Crump et al. | |
| 9,168,697 B2 * | 10/2015 | Crump | B33Y 10/00 |
| 9,580,551 B2 | 2/2017 | Vanelli et al. | |
| 9,592,660 B2 | 3/2017 | Reese et al. | |
| 9,656,427 B2 | 5/2017 | Griszbacher | |
| 9,682,424 B2 | 6/2017 | Mironets et al. | |
| 9,688,026 B2 | 6/2017 | Ho et al. | |
| 9,744,723 B2 | 8/2017 | Baumann et al. | |
| 10,005,240 B2 * | 6/2018 | Chen | B29C 64/35 |
| 2002/0079601 A1 * | 6/2002 | Russell | B29C 41/12 264/40.1 |
| 2008/0268143 A1 * | 10/2008 | Vahlas | B01B 1/005 427/185 |
| 2010/0044547 A1 * | 2/2010 | Higashi | B22F 3/003 249/79 |
| 2013/0049247 A1 | 2/2013 | Boivin et al. | |
| 2015/0125333 A1 | 5/2015 | Bruck et al. | |
| 2016/0193695 A1 | 7/2016 | Haynes | |
| 2016/0200053 A1 | 7/2016 | Chen et al. | |
| 2017/0050386 A1 | 2/2017 | Houben et al. | |
| 2017/0081752 A1 | 3/2017 | Hanley | |
| 2017/0190112 A1 | 7/2017 | Thorson et al. | |
| 2017/0266759 A1 * | 9/2017 | Fieret | B33Y 10/00 |
| 2017/0313050 A1 | 11/2017 | DeFelice et al. | |
| 2018/0001553 A1 | 1/2018 | Buller et al. | |
| 2018/0043614 A1 * | 2/2018 | Greenfield | B33Y 30/00 |
| 2018/0043632 A1 * | 2/2018 | Schuller | B29C 64/295 |
| 2018/0126460 A1 | 5/2018 | Murphree et al. | |

OTHER PUBLICATIONS

United States Office Action Corresponding to U.S. Appl. No. 15/878,569 dated Nov. 8, 2019.
International Search Report and Written Opinion Corresponding to PCT Application No. 2018066118 dated Apr. 22, 2019.

* cited by examiner

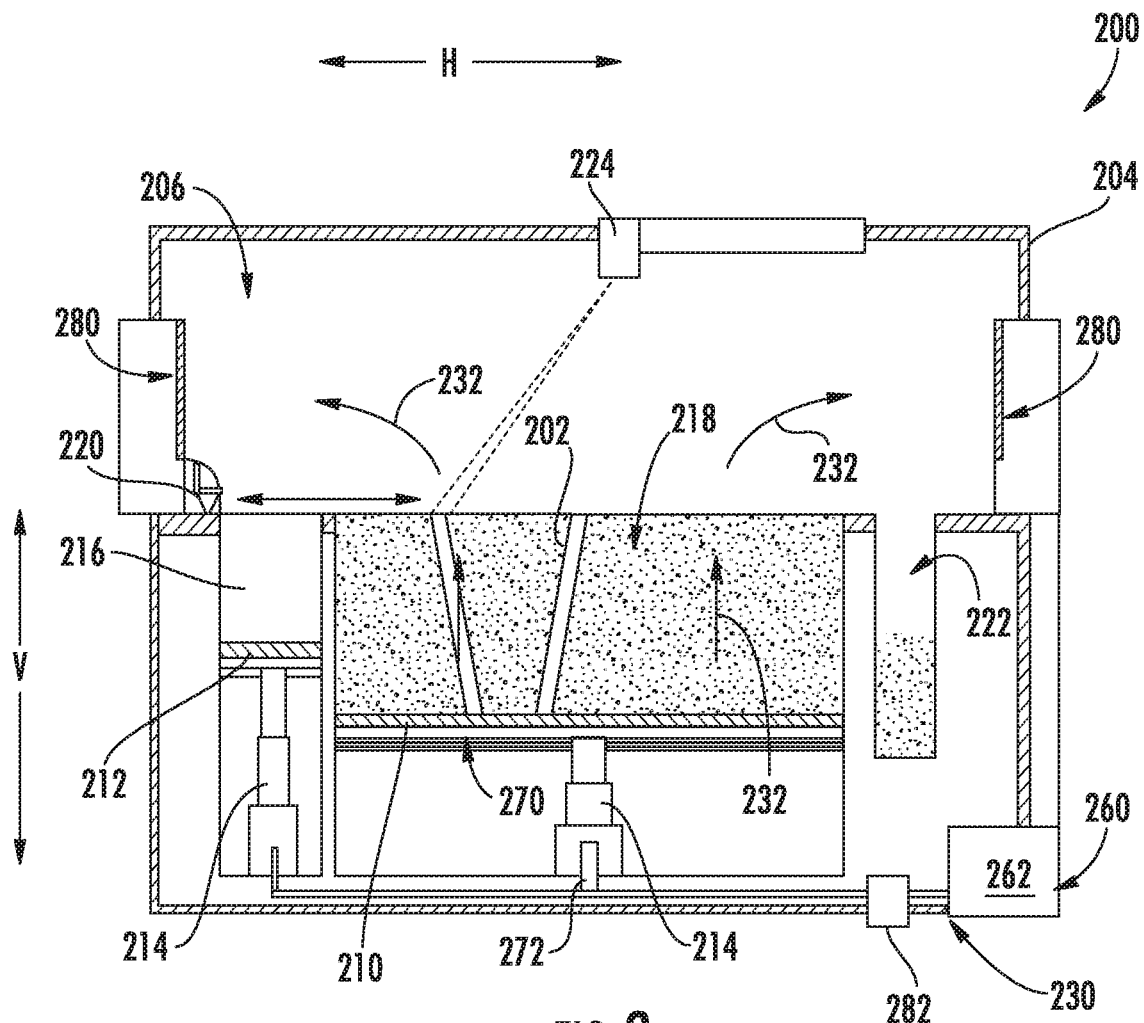
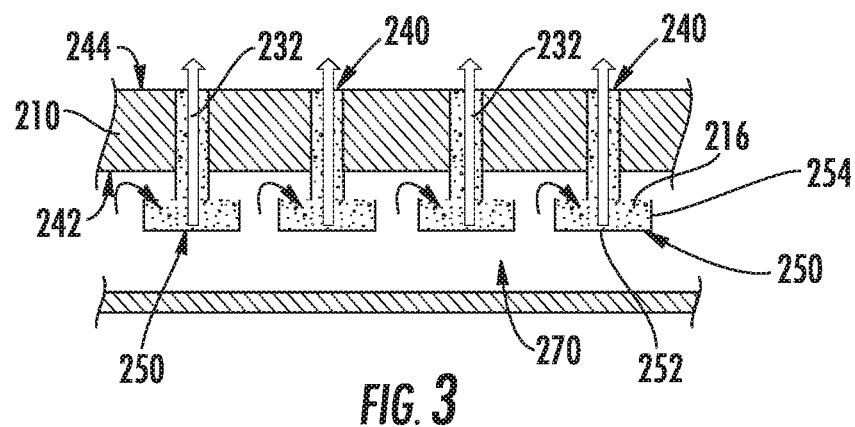

HEATED GAS CIRCULATION SYSTEM FOR AN ADDITIVE MANUFACTURING MACHINE

FIELD

The present disclosure generally relates to thermal regulation within an additive manufacturing machine, or more particularly, to a heated gas circulation system for regulating the temperature of a powder bed within an additive manufacturing machine.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

Notably, thermal gradients within a powder bed during an additive manufacturing process can cause uneven growth of manufactured parts. More specifically, conventional DMLM machines use an energy source to melt a top layer of additive powder, but add no other heat within the build enclosure or powder bed. This drives a strong thermal gradient throughout the powder bed, with top layers being much hotter than the cooler lower layers. As a result, these parts often grow and deform in non-uniform ways, resulting in parts that fail to meet dimensional tolerances. In addition, the occurrence of such non-uniform growth and deformation during the build can cause cracking or structural failure of the component that are frequently not repairable during post-processing procedures.

Accordingly, an additive manufacturing machine with improved features for regulating thermal gradients throughout the machine would be useful. More particularly, an additive manufacturing machine that reduces thermally induced stresses and deformation in formed components would be particularly beneficial.

BRIEF DESCRIPTION

Aspects and advantages will be set forth in part in the following description, or may be obvious from the description, or may be learned through practice of the invention.

According to one embodiment of the present subject matter, an additive manufacturing machine defining a vertical direction is provided. The additive manufacturing machine includes an enclosure defining a build area and a build platform positioned within the build area, the build platform defining a plurality of perforations. A heated gas supply is in fluid communication with the plurality of perforations for providing a flow of heated gas through the plurality of perforations.

According to another exemplary embodiment, a heated gas circulation system for an additive manufacturing machine is provided. The additive manufacturing machine includes a build platform positioned within an enclosure and the heated gas circulation system includes a heated gas supply for urging a flow of heated gas. A distribution manifold is positioned below the build platform along a vertical direction, the distribution manifold providing fluid communication between the heated gas supply and a plurality of perforations defined through the build platform.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 2 shows a schematic view of an additive manufacturing machine including a heated gas circulation system according to an exemplary embodiment of the present subject matter.

FIG. 3 shows a cross sectional view of a build platform of the exemplary additive manufacturing machine of FIG. 2 according to an exemplary embodiment of the present subject matter.

Figure 1:
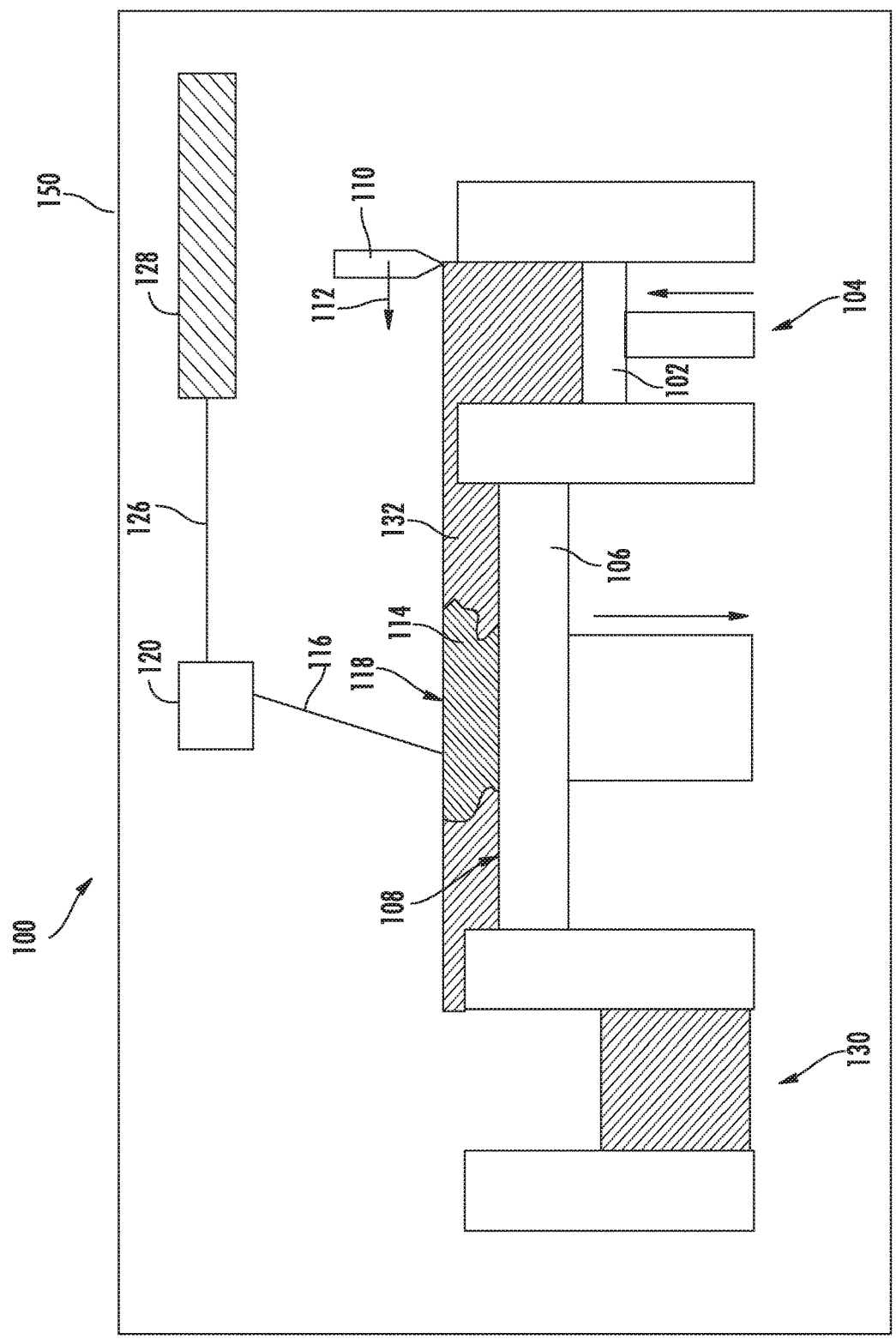
FIG. 1 shows a schematic view of an additive manufacturing machine according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, as used herein, terms of approximation, such as "approximately," "substantially," or "about," refer to being within a ten percent margin of error.

An additive manufacturing machine is generally provided which includes a heated gas circulation system for regulating the temperature of additive powder throughout a powder bed and parts formed therein. The additive manufacturing machine includes a build platform defining a plurality of perforations and a heated gas supply that provides a flow of heated air into a distribution manifold and through the plurality of perforations and the powder bed to minimize temperature gradients within the powder bed which might otherwise result in distortion, thermal stresses, or cracking in the finished part.

Referring to FIG. 1, a conventional laser powder bed fusion system, such as DMLS or DMLM system 100 will be described. As illustrated, system 100 includes a fixed and enclosed build chamber 150. Inside the build chamber 150 is a build plate 106 that is flanked by a feed powder reservoir 104 at one end and an excess powder receptacle 130 at the other end. During production, an elevator 102 in the feed powder reservoir 104 lifts a prescribed dose of powder above the level of a build plate 106. The prescribed dose of powder is then spread in a thin, even layer 132 over the build surface 108 by a recoater mechanism 110. For example, as shown in FIG. 1, the powder is spread in a direction as indicated by the arrow 112. Overflows from the build plate 106 are collected by the excess powder receptacle 130, then optionally treated to sieve out loose, agglomerated particles before re-use. Current powder bed technologies are discrete and intermittent in that the laser or electron beam must pause to wait for the subsequent layer of powder to be leveled.

The recoater mechanism 110 may be a hard scraper, a soft squeegee, or a roller. A selective portion of the powder 114 that corresponds to a "slice" or a layer of the part to be manufactured is then sintered or melted by a focused laser 116 scanning across the surface of the selective portion 118. In other words, the powder layer 132 is subjected to laser radiation in a site-selective manner in dependence on computer-aided design (CAD) data, which is based on the desired geometry of the work piece that is to be produced. The laser irradiation sinters or melts the raw material powder, and the sintered/melted area then re-solidifies and re-crystallizes into a fused region of the work piece.

Using a plurality of movable mirrors or scanning lenses, a galvanometer scanner 120 moves or scans the focal point of the laser beam 126 emitted by the laser source 128 across the build surface 108 during the laser melting and sintering processes. The galvanometer scanner in powder bed fusion technologies is typically of a fixed position but the movable mirrors/lenses contained therein allow various properties of the laser beam to be controlled and adjusted.

Notably, thermal gradients within a powder bed during an additive manufacturing process can cause uneven growth of manufactured parts. More specifically, conventional DMLM machines use a laser, electron beam, or other energy source to sinter or melt a top layer of additive powder, but add no other heat within the build enclosure or powder bed. This process drives a strong thermal gradient throughout the powder bed, the manufactured part, and within the build chamber. As a result of the non-uniform thermal loading within the build chamber, high induced stresses may be introduced into manufactured parts. In addition, these parts often grow and deform in non-uniform ways, resulting in parts that fail to meet dimensional tolerances and cause inconsistent build processes due to the significant dimensional changes resulting from the temperature variations. In addition, such non-uniform growth can cause cracking or structural failure of the component that are frequently not repairable during post-processing procedures. Aspects of the present subject matter address these thermal, dimensional, and alignment issues by reducing thermal gradients and making thermally driven dimensional changes more predictable and manageable, e.g., by thermally stabilizing the build process and related elements.

Referring now to FIG. 2, an additive manufacturing machine 200 will be described according to an exemplary embodiment of the present subject matter. As shown, additive manufacturing machine 200 generally defines a vertical direction V which corresponds to a build direction of additively manufactured component 202. Although additive manufacturing machine 200 is used herein as an exemplary machine for forming component 202, it should be appreciated that aspects of the present subject matter may be used in other additive manufacturing machines used for forming other components.

As illustrated, machine 200 includes enclosure 204 which generally defines a build area 206. According to exemplary embodiments, the enclosure 204 may be insulated to retain heat within build area 206. Similar to system 100 described above with respect to FIG. 1, machine 200 includes a build platform 210 and a dosing platform 212 that are positioned within build area 206 and movable along the vertical direction V. In this regard, for example, each of build platform 210 and dosing platform 212 are supported by lift mechanisms or positioning mechanisms 214, which may include, for example, hydraulic lifts or any other suitable vertical support means.

During operation, powder source of dosing platform 212 is movable along the vertical direction V to raise additive powder 216 above the top layer of powder bed 218 and a recoater arm 220 moves along a horizontal direction H to spread a thin layer of additive powder 216 on top of powder bed 218. Excess powder is deposited by recoater arm 220 into an overflow reservoir 222 for later reuse. After energy source 224 selectively fuses a portion of additive powder 216, build platform 210 lowers, another layer of additive powder 216 is deposited, and the process is repeated until the component is finished.

According to an exemplary embodiment of the present subject matter, machine 200 includes a heated gas circulation system 230 which is generally configured for providing a flow of heated gas (as indicated by arrows 232) throughout build area 206 and/or powder bed 218 to reduce thermal gradients within machine 200. As described below according to an exemplary embodiment, machine 200 includes a variety of features for facilitating the flow of heated gas 232 throughout temperature sensitive regions within machine 200. However, it should be appreciated that the configuration described below is only exemplary and is not intended to limit the scope of the present subject matter.

According to the illustrated embodiment of FIGS. 2 and 3, build platform 210 defines a plurality of perforations 240 which generally extend through build platform 210 to receive the flow of heated gas 232. For example, according to the illustrated embodiment, perforations 240 extends substantially along the vertical direction V from a bottom 242 of build platform 210 to a top 244 build platform 210. According to the illustrated embodiment, perforations 240 are spaced equidistant relative to each other and are positioned throughout build platform 210. As an example, each perforation 240 is substantially cylindrical and is sized to prevent excessive flow of additive powder 216 through build platform 210 while permitting the flow of heated gas 232 therethrough. However, it should be appreciated that according to alternative embodiments, perforations 240 may have any suitable size, shape, and orientation relative to the build platform 210, e.g., to facilitate the flow heated gas 232.

Referring now specifically to FIG. 3, machine 200 may further include a plurality of catch trays 250 which are generally configured to restrict the flow of additive powder 216 through perforations 240. More specifically, a single catch tray 250 may be positioned below each of the plurality of perforations 240. Each catch tray 250 may include a bottom wall 252 positioned below the corresponding perforation 240 along the vertical direction V, and may also include a raised wall 254 that extends around a perimeter of bottom wall 252 and along the vertical direction V to prevent additive powder 216 from piling up and falling over the edges of bottom wall 252 and out of catch tray 250. In this manner, catch trays 250 are generally configured for permitting a certain amount of additive powder 216 pass through perforation 240 and collect on bottom wall 252 until the flow is sufficiently restricted to prevent further additive powder 216 from flowing.

Notably, catch trays 250 are spaced apart from bottom 242 of build platform 210 in order to permit the flow of heated gas 232 to pass over raised wall 254 and through the collected additive powder 216 and perforations 240 into powder bed 218. In addition, catch trays 250 are only one method of restricting the flow of additive powder 216 through perforations 240 without restricting the flow of heated gas 232. Other embodiments may use alternative methods of restricting or containing additive powder 216, such as filter screens, one-way valves, very small apertures that permit only the flow of heated gas 232, etc.

Figure 4:
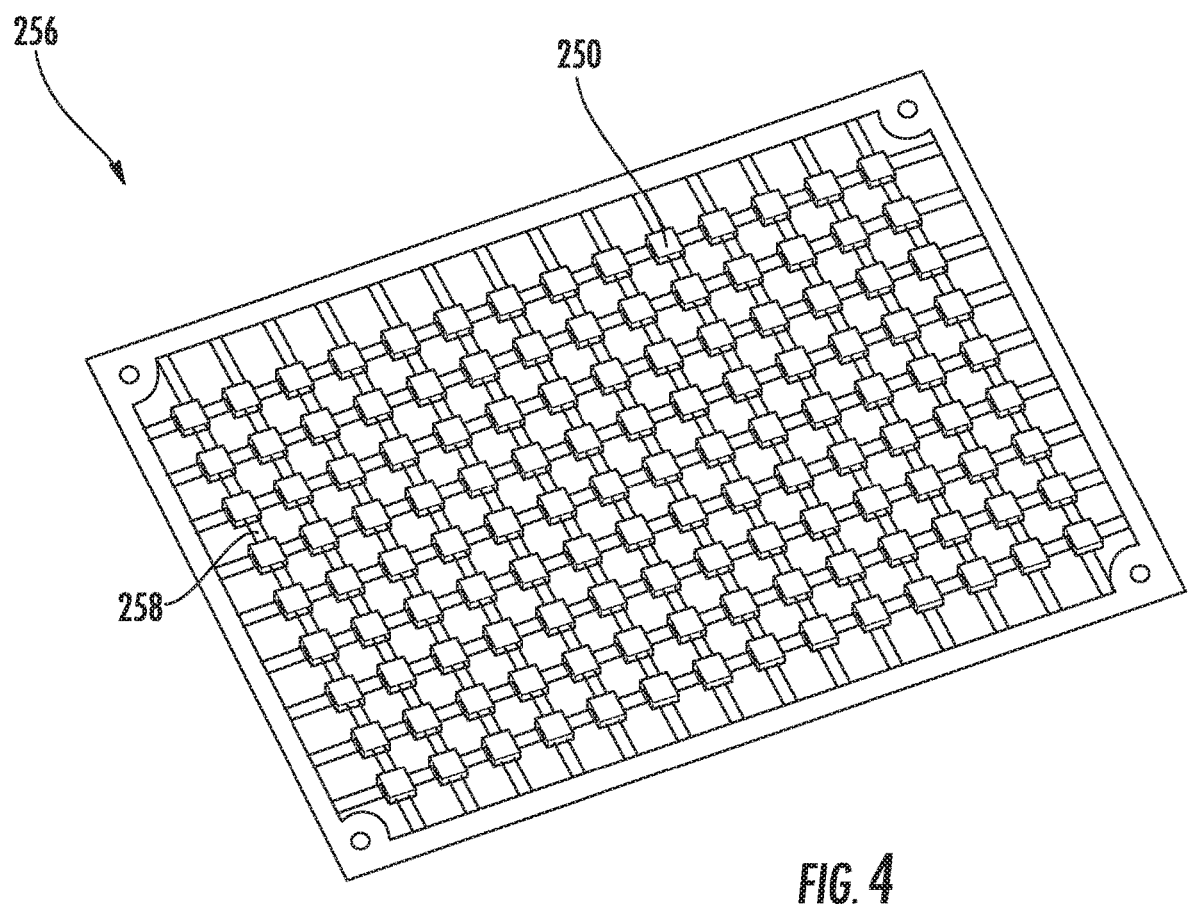
FIG. 4 shows a tray assembly for joining a plurality of catch trays positioned under the exemplary build platform of FIG. 3 according to an exemplary embodiment of the present subject matter.

Referring now briefly to FIG. 4, according to an exemplary embodiment, catch trays 250 may joined together using a tray assembly 256. As illustrated, tray assembly 256 may include a plurality of frame members 258 that extend between adjacent catch trays 250 to form a grid-work of catch trays 250 that may be moved as a single unit. In this manner, for example, tray assembly 256 may be attached to a bottom of build platform 210 and spaced apart from build platform 210 by the necessary vertical spacing to facilitate improved flow of heated gas 232 and preventing excess powder from escaping catch trays 250.

Referring still to FIGS. 2 and 3, heated gas circulation system 230 will be described according to an exemplary embodiment. In general, heated gas circulation system 230 includes a heated gas supply 260 that is generally configured for providing the flow of heated gas 232. For example, according to an exemplary embodiment, heated gas supply 260 is a hot inert gas generator 262 that generates hot gas for use in reducing thermal gradients throughout build area 206.

As illustrated, heated gas supply 260 is in fluid communication with perforations 240 for providing the flow of heated gas 232 through perforations 240. More specifically, machine 200 includes a distribution manifold 270 which is positioned below build platform 210 along the vertical direction V. Distribution manifold 270 provides fluid communication between perforations 240 and heated gas supply 260. In addition, distribution manifold 270 distributes the flow of heated gas 232 along the entire depth and width of build platform 210 defined along the horizontal direction H. In this manner, each perforation 240 may receive a substantially uniform and equivalent flow of heated gas 232 to facilitate the even heating of powder bed 218. In addition, distribution manifold 270 serves to heat build platform 210. This serves to keep thin layers of powder on the surface of build platform 210 hot during early in the build process when the height of the powder bed is small and hot gas diffusion thru powder bed 218 via perforations 240 is not fully developed because the spacing between perforations 240 is large relative to the accumulated powder height on build platform 210.

Referring now specifically to FIG. 2, one exemplary system for providing fluid communication between heated gas supply 260 and distribution manifold 270 will be described. As illustrated, heated gas circulation system 230 includes an inlet conduit 272 that extends between heated gas supply 260 and distribution manifold 270 for providing the flow of heated gas 232 into distribution manifold 270. More specifically, inlet conduit may extend through positioning mechanism 214 upward along the vertical direction V to distribution manifold 270. However, it should be appreciated that according to alternative embodiments, heated gas supply 260 may be fluidly coupled to distribution manifold 270 using any suitable fluid conduits or manifold systems.

In addition, heated gas circulation system 230 may include one or more hot gas intakes 280 that are positioned within build area 206 for recirculating the flow of heated gas 232 back through heated gas supply 260. More specifically, according to the illustrated embodiment, hot gas intakes 280 are positioned above build platform 210 along the vertical direction V to draw the flow of heated gas 232 upward through powder bed 218. In addition, heated gas circulation system 230 may further include a circulation pump 282 which works with heated gas supply 260 to continuously circulate the flow of heated gas 232. In this manner, there may be a constant, even flow of heated gas 232 up through powder bed 218 to maintain relatively consistent thermal gradients throughout powder bed 218. More specifically, the flow of heated gas 232 may maintain powder bed 218 at an elevated thermal state that reduces the temperature difference between powder bed 218 and the melt pool and stabilizes the process to generate reduced thermal gradients relative to the process carried out in prior art machines.

According to the illustrated embodiment, heated gas supply 260 (or circulation pump 282) urges the flow of heated gas 232 through inlet conduit 272, into distribution manifold 270, through perforations 240, and up through powder bed 218 along the vertical direction V. However, it should be appreciated that according to alternative embodiments, the flow of heated gas 232 may flow in a reverse direction, e.g., down through powder bed 218. According still other embodiments, any suitable heated gas flow path may be defined throughout machine 200 to minimize thermal gradients within build area 206 and/or powder bed 218. The embodiments described herein only examples used for the purpose of illustration and are not intended to limit the scope of the present subject matter.

Notably, in addition to heating powder bed 218, it may be desirable to heat additive powder 216 supported by dosing platform 212. Therefore, according to an exemplary embodiment, dosing platform 212 may further define a plurality of dosing perforations 240 that are in fluid communication with heated gas supply 260 and operate in a similar manner to perforations 240 defined in build platform 210. Moreover, the gas supply 260 may be in fluid communication with any other components or regions within machine 200 to provide even heating and reduce thermal gradients.

As explained above, heated gas circulation system 230 urges the flow of heated gas 232 to maintain powder bed 218 at an elevated thermal state or temperature. To avoid thermally driven interaction and caking (e.g., "auto-sintering") of the powder particles within powder bed 218, the flow of heated gas 232 may be regulated to adjust a temperature in the build chamber or powder bed 218 to a specific temperature or temperature range which may vary according to process parameters, powder type, etc. For example, according to one exemplary embodiment, the temperature of powder bed 218 is regulated to be within about 50-90% of the melting point of the powder alloy within powder bed 218. According to alternative embodiments, the temperature of powder bed 218 may be regulated to be within 60-80%, or about 70% of the melting temperature of the powder. The actual auto-sintering temperature depends on a lot of factors, e.g., the atmosphere, required density, powder characteristics, etc.

Controlling the transfer of heat energy across the chamber boundaries and within powder bed 218, as well as maintaining the process environment at elevated temperature helps to reduce the temperature difference between the melt pool and its surrounding environment (e.g., powder bed 218). This temperature difference is the source for driving non-uniform temperatures and thermal growth within the process. Non-uniform thermal growth leads to dimensional deformation that can warp and induce stresses in the solidified members of the build. These detrimental effects that often increase process costs and lead to parts of reduced and often unacceptable quality can all be reducing by controlling the magnitude of the temperature difference generated during the process. In addition, maintaining a high temperature in the built chamber and powder bed 218 during processing requires less fusion-energy for generating the melt pool.

Heated gas circulation system 230 works in conjunction with the operating system of AM machine 200 to ensure optimal conditions within the machine environment throughout all phases of the build process. Heated gas circulation system 230 accommodates the loading and unloading processes of the machine environment with purge and backfill of the enclosed chamber area with the inert gas. Means for measuring oxygen content of the atmosphere and for maintaining the system below a desired oxygen level throughout the build process may be provided. Heated gas circulation system 230 incorporates the necessary feedback controls for setting and maintaining the desired temperature of the powder bed environment. The operating system ramps up thermal state of the machine environment when the build is initiated and ensures that the build process occurs only when AM machine 200 is at the optimal thermal operating conditions. After build completion, AM machine 200 operating system ramps the thermal state down to a safe level for unloading.

Therefore, the heated gas circulation system described herein includes a heated gas supply for providing a flow of heated gas through a powder bed, through a powder supply reservoir, and throughout a build enclosure. As a result, harmful temperature gradients within the additive manufacturing machine are minimized, resulting in improved manufacturing tolerances, reduced stresses, and higher quality finished components.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine defining a vertical direction, the additive manufacturing machine comprising:
    an enclosure defining a build area;
    a build platform positioned within the build area, the build platform defining a plurality of perforations;
    a heated gas supply in fluid communication with the plurality of perforations for providing a flow of heated gas through the plurality of perforations; and
    a plurality of catch trays spaced apart from a bottom of the build platform below the plurality of perforations, wherein each of the catch trays comprises a bottom wall and a raised wall extending around a perimeter of the bottom wall for restricting the flow of additive powder through the perforations and such that the flow of heated gas passes over the raised wall and through the plurality of perforations.

2. The additive manufacturing machine of claim 1, wherein the perforations extend substantially along the vertical direction from a bottom of the build platform to a top of the build platform.

3. The additive manufacturing machine of claim 1, wherein the additive manufacturing machine further comprises:
a distribution manifold positioned below the build platform along the vertical direction, the distribution manifold providing fluid communication between the perforations and the heated gas supply.

4. The additive manufacturing machine of claim 3, wherein the additive manufacturing machine further comprises:
an inlet conduit extending between the heated gas supply and the distribution manifold for providing the flow of heated gas.

5. The additive manufacturing machine of claim 4, wherein the build platform is supported by a positioning mechanism that moves build platform along the vertical direction, and wherein the inlet conduit extends through the positioning mechanism and is fluidly coupled to the distribution manifold.

6. The additive manufacturing machine of claim 1, wherein the additive manufacturing machine further comprises:
a dosing platform positioned within the build area, the dosing platform defining a plurality of dosing perforations, wherein the heated gas supply is in fluid communication with the plurality of dosing perforations for providing the flow of heated gas through the plurality of dosing perforations.

7. The additive manufacturing machine of claim 1, wherein the heated gas supply is part of a circulation system, the circulation system comprising:
one or more hot gas intakes defined within the build area for recirculating the flow of heated gas back through the heated gas supply.

8. The additive manufacturing machine of claim 7, wherein the gas intakes are positioned above the build platform along the vertical direction.

9. The additive manufacturing machine of claim 7, wherein the circulation system further comprises a circulation pump for urging the flow of heated gas.

10. The additive manufacturing machine of claim 1, wherein the heated gas supply is a hot inert gas generator.

11. The additive manufacturing machine of claim 1, wherein the enclosure is insulated to retain heat within the build area.

12. A heated gas circulation system for an additive manufacturing machine, the additive manufacturing machine comprising a build platform positioned within an enclosure, the heated gas circulation system comprising:
a heated gas supply for urging a flow of heated gas;
a distribution manifold positioned below the build platform, the distribution manifold providing fluid communication between the heated gas supply and a plurality of perforations defined through the build platform; and
a plurality of catch trays spaced apart from a bottom of the build platform below the plurality of perforations, wherein each of the catch trays comprises a bottom wall and a raised wall extending around a perimeter of the bottom wall for restricting a flow of additive powder through the perforations and such that the flow of heated gas passes over the raised wall and through the plurality of perforations.

13. The heated gas circulation system of claim 12, further comprising:
an inlet conduit extending between the heated gas supply and the distribution manifold for providing the flow of heated gas.

14. The heated gas circulation system of claim 12, further comprising:
one or more hot gas intakes defined within the enclosure for recirculating the flow of heated gas back through the heated gas supply.

15. The heated gas circulation system of claim 12, wherein the gas intakes are positioned above the build platform along the vertical direction.

16. The heated gas circulation system of claim 12, further comprising a circulation pump for urging the flow of heated gas.

17. The heated gas circulation system of claim 12, wherein the heated gas supply is a hot inert gas generator.

18. The additive manufacturing machine of claim 1, wherein the plurality of catch trays are spaced apart to permit the flow of heated gas to pass through the plurality of trays and upward through the plurality of perforations.

19. The additive manufacturing machine of claim 1, wherein the plurality of catch trays are joined together by a plurality of frame members that extend between the plurality of catch trays.

* * * * *